Figure 1:
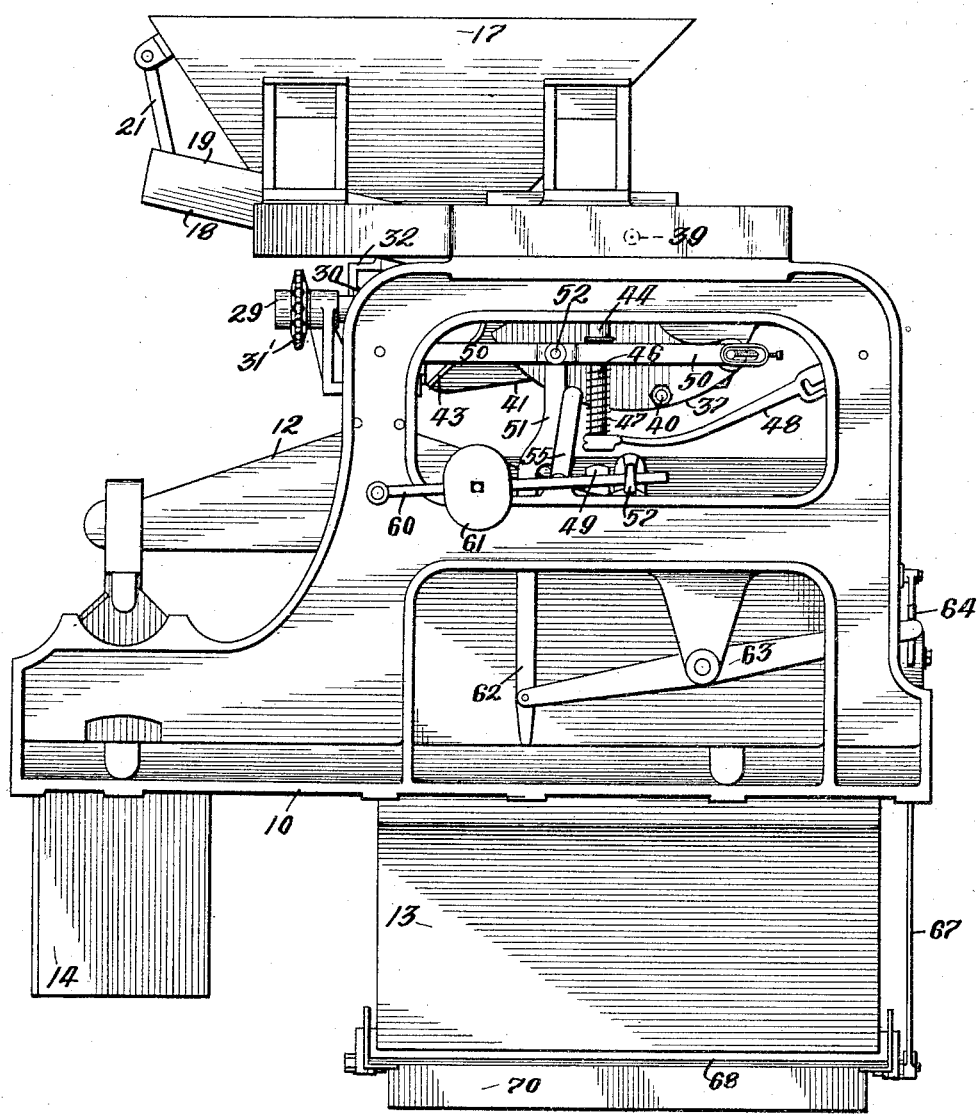

H. W. WELSH.
AUTOMATIC WEIGHING MACHINE.
APPLICATION FILED FEB. 23, 1911.

1,072,541.

Patented Sept. 9, 1913.
7 SHEETS—SHEET 1.

Witnesses
R. L. Farrington
C. H. Keeney

Inventor.
Henry W. Welsh
by Morsell and Caldwell
Attys.

H. W. WELSH.
AUTOMATIC WEIGHING MACHINE.
APPLICATION FILED FEB. 23, 1911.

1,072,541.

Patented Sept. 9, 1913.
7 SHEETS—SHEET 4.

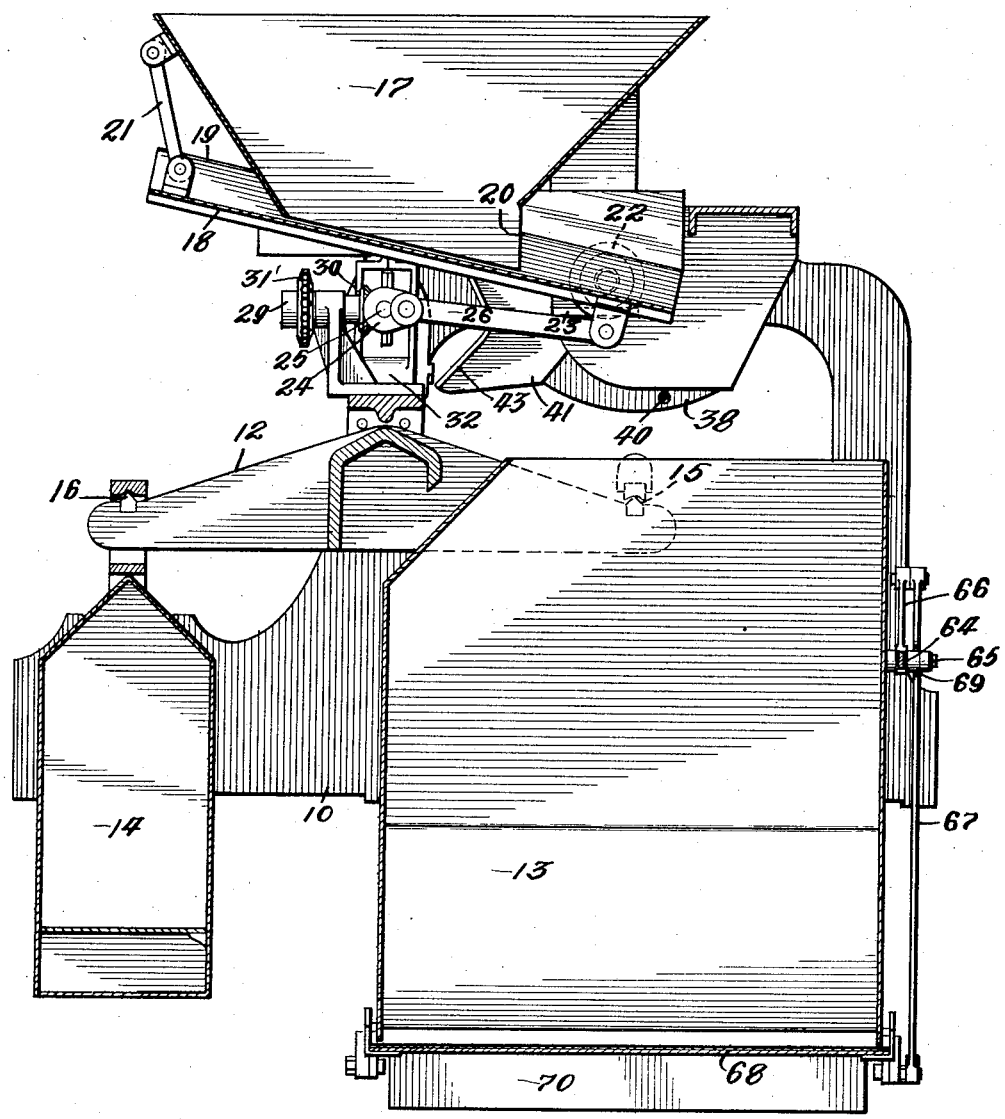

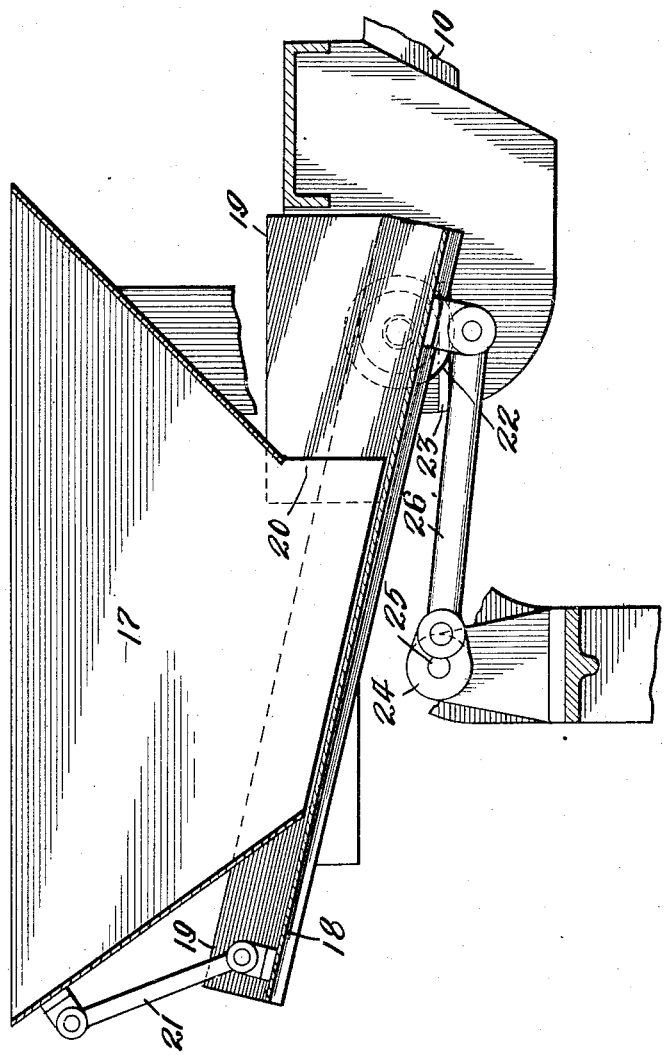

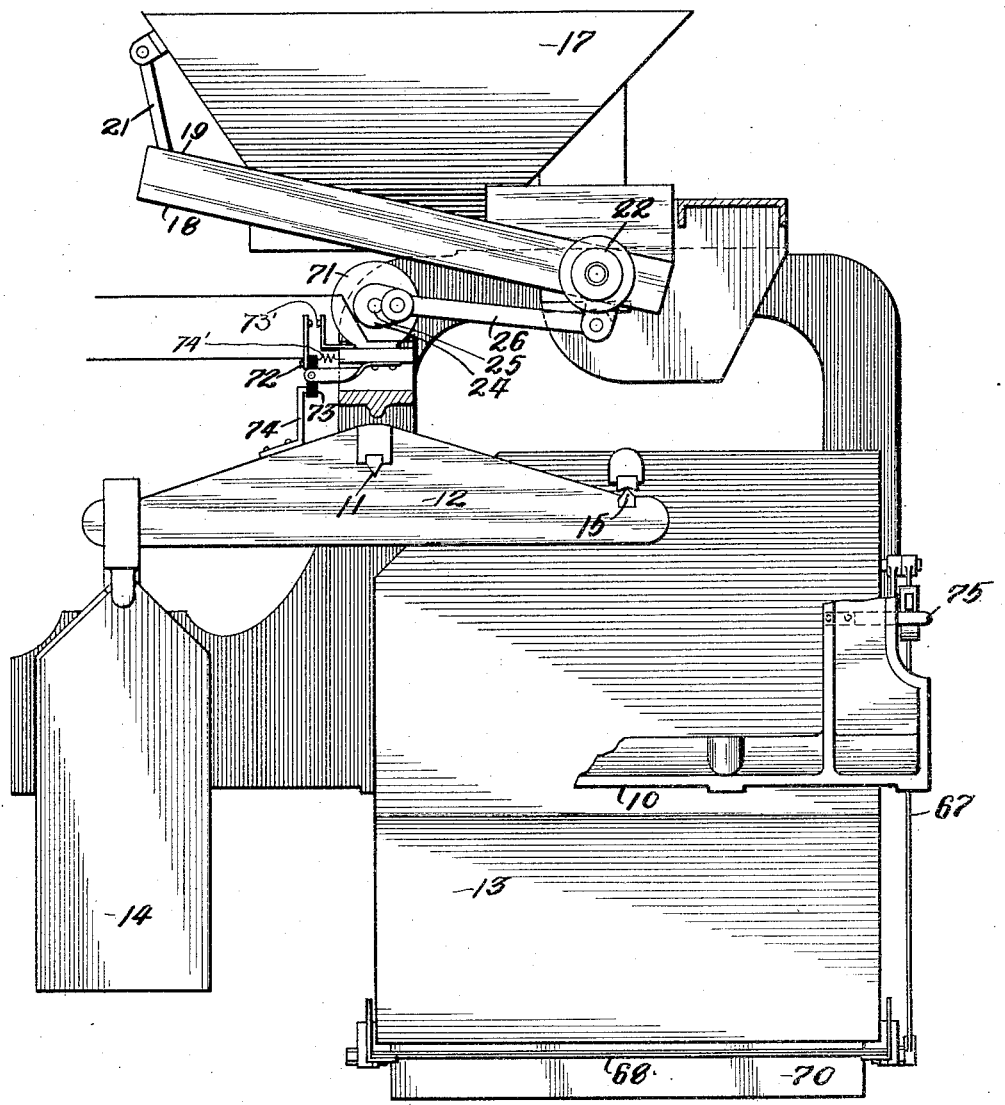

UNITED STATES PATENT OFFICE.

HENRY W. WELSH, OF NORTH MILWAUKEE, WISCONSIN, ASSIGNOR TO AVERY SCALE COMPANY, OF NORTH MILWAUKEE, WISCONSIN, A CORPORATION OF WISCONSIN.

AUTOMATIC WEIGHING-MACHINE.

1,072,541.  Specification of Letters Patent.  Patented Sept. 9, 1913.

Application filed February 23, 1911.  Serial No. 610,148.

*To all whom it may concern:*

Be it known that I, HENRY W. WELSH, a subject of the King of Great Britain, residing in North Milwaukee, in the county of Milwaukee and State of Wisconsin, have invented new and useful Improvements in Automatic Weighing-Machines, of which the following is a description, reference being had to the accompanying drawings, which are a part of this specification.

This invention relates to improvements in automatic weighing machines and more particularly to that type of machine for weighing coal, cotton seed and other like materials which will not flow freely through ordinary hopper openings and require means other than gravity for moving and dividing the material for accurate weighing.

In handling and weighing coal and especially the poorer grades of coal known as screenings, it has been found that the coal is more or less damp and tenacious in character and does not readily flow through comparatively small openings nor does it flow in a continuous steady stream.

It is one of the objects of this invention to provide an automatic weighing machine of the character described which is provided with means for causing the coal or other like material to flow in a continuous steady stream when desired and to stop the flow of material when the weighing hopper has been filled to the desired extent and while the hopper is being discharged.

A further object of the invention is to provide the feed chute of the automatic scale of the character described with a vibrating feed gate or bottom portion to cause a continuous feed of the material into the weighing hopper;

With the above, and other objects in view, the invention consists of the automatic weighing scale and its parts and combinations as set forth in the claims, and all equivalents thereof.

In the accompanying drawings in which the same reference characters indicate the same parts in all of the views.

Figure 2:
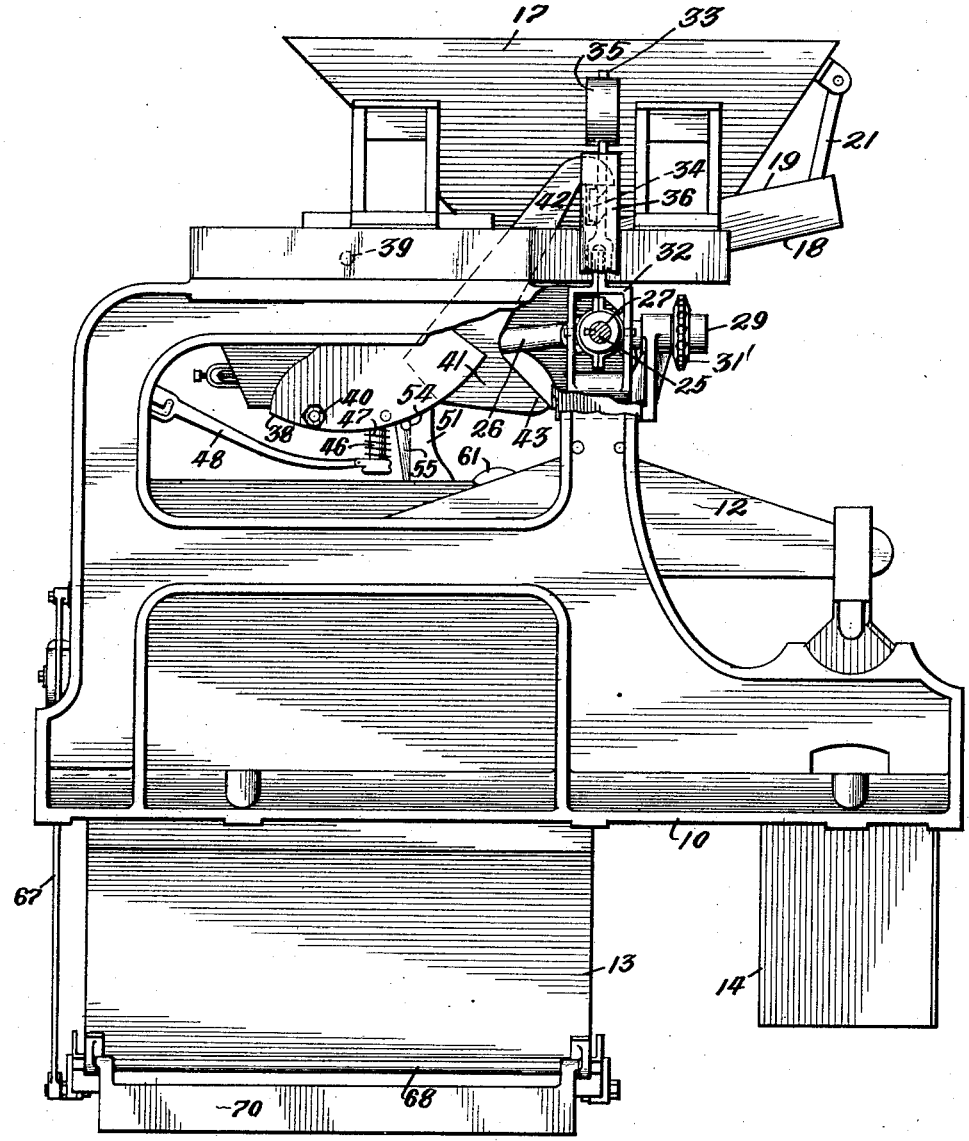
Figure 3:
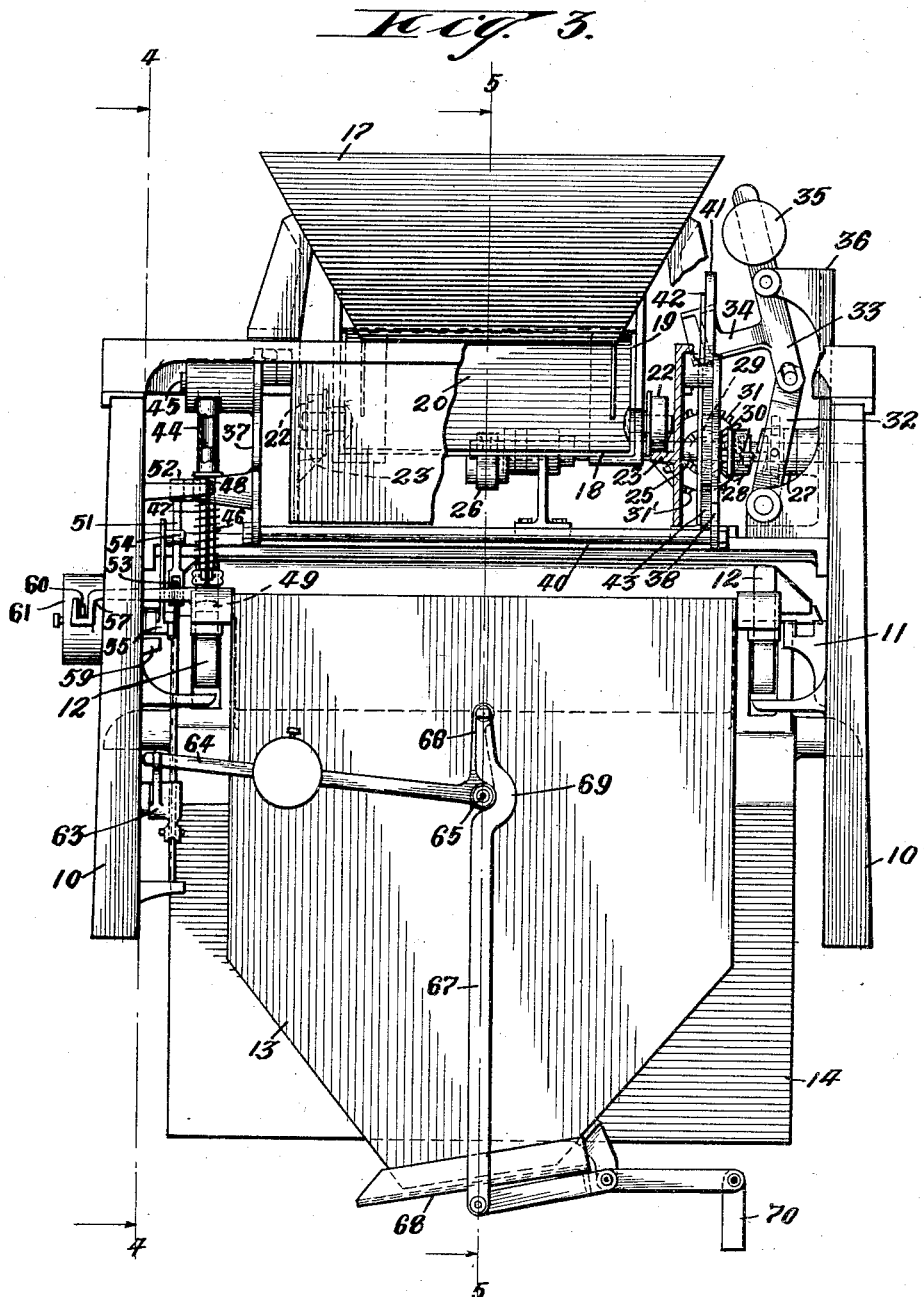
Figure 4:
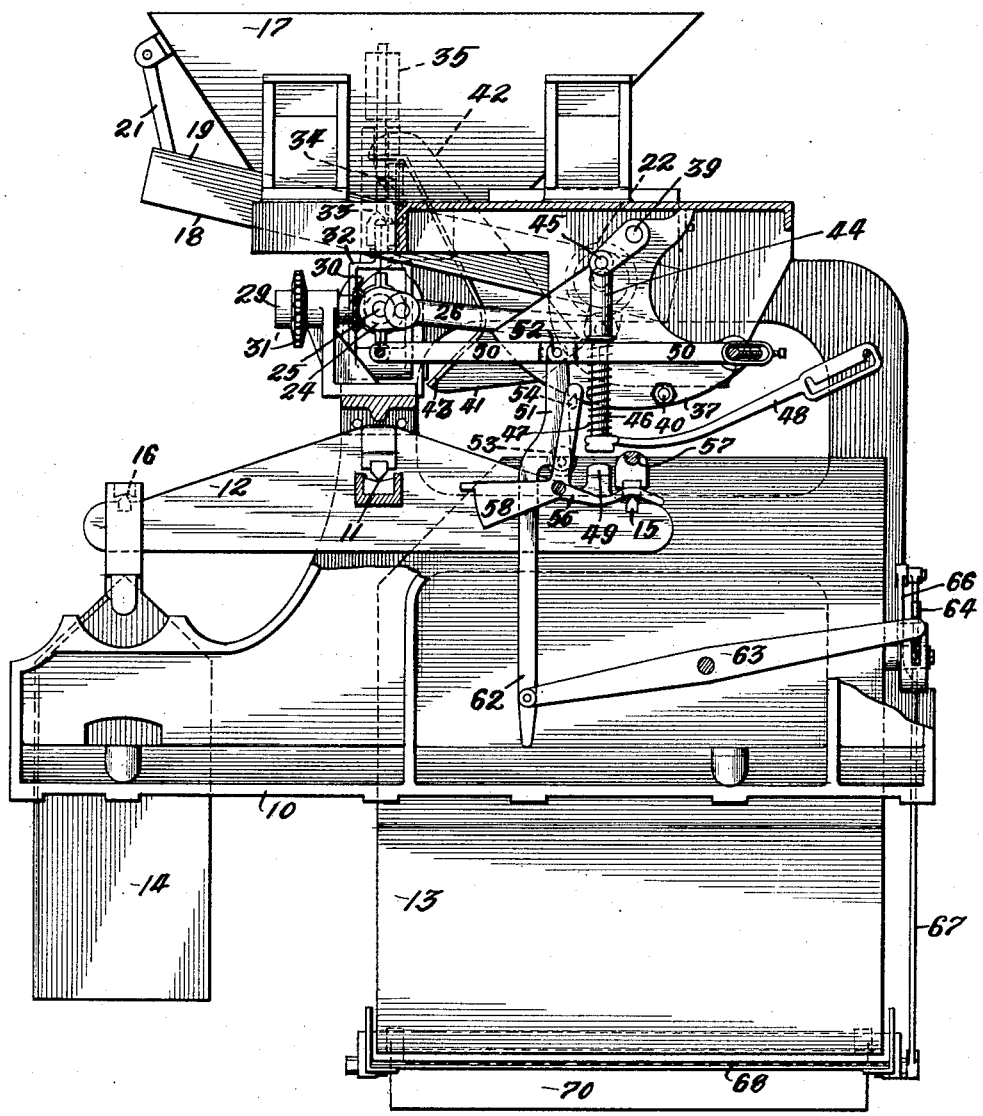

Figure 1 is a side view of the complete weighing machine showing the weighing hopper as filled with material and balanced on the weighing beam and just previous to moving to the discharging position; Fig. 2 is a similar view of the opposite side of the weighing machine, parts broken away to show other parts in the rear thereof; Fig. 3 is an end view of the weighing machine parts broken away to show other parts in the rear thereof; Fig. 4 is a vertical sectional view of the weighing machine taken on line 4—4 of Fig. 3, parts broken away to show other parts in the rear thereof; Fig. 5 is a vertical sectional view of the weighing machine taken on line 5—5 of Fig. 3; Fig. 6 is a detail view on a larger scale of the feed hopper and connected parts; and Fig. 7 is a side view, with parts broken away, of a modified form of means for controlling the operation of the vibrating feed gate.

Referring to the drawings the numeral 10 indicates the main frame of the weighing machine and 11 the fulcrum on which is pivotally mounted the weighing beam 12. This beam is of the even balance type and carries a material weighing hopper 13 on its inner end and a weight box 14 on its outer end on points 15 and 16, respectively spaced equi-distant from the fulcrum. The weight box is balanced with reference to the hopper so that with every pound weight in the weight box there must be exactly one pound of material in the weighing hopper to balance it on every weighing.

A hopper chute 17 resting on top of the main frame is provided with a vibratory gate or bottom portion 18 which extends beneath the open bottom portion of the hopper chute and at a distance beyond each end thereof. The gate is provided with side flanges 19 which extend upwardly on both sides of the hopper chute and the lower end of the gate is positioned directly above the weighing hopper so that all material discharged from the end of the gate will fall into the weighing hopper. A discharge opening 20 on one end of the hopper provides for the discharge of the material therefrom when the gate is vibrated. The upper end of the gate is suspended from the hopper chute by links 21 and the lower end of the gate is provided with wheels 22 which rest on the inclined tracks 23 to provide for the oscillatory or vibratory movement of said gate. The gate is vibrated by means of a crank 24 provided on one side of a clutch shaft 25 and having a connecting rod 26 connected thereto and to the lower end portion of the gate. The shaft is journaled on the main frame and its rotation is controlled by a clutch member 27 which is splined on said shaft and is adapted to be moved into engagement with the jaws of the complementary clutch member 28 which is loosely journaled on the shaft. A power shaft 29 journaled on the frame and extending horizontally at right angles with relation to the clutch shaft 25 is provided with a miter pinion 30 which meshes with another miter pinion 31 loosely journaled on the clutch shaft and formed integral with the complementary clutch member. A sprocket wheel 31′ carried by the power shaft serves as a means for connection with a source of power. The clutch member is moved into and out of engagement with the complementary clutch member by means of a clutch yoke 32 which forms the lower link of a weighted toggle joint. The upper link 33 of this toggle is provided with an operating arm 34 projecting at right angles from the medial portion thereof and at its upper end carries a weight 35 for swinging the link over the vertical center of the pivotal connection. The upper and lower end portions of the links are pivotally connected to a bracket 36 carried by the frame.

Two segmental plates 37 and 38 pivotally suspended from opposite sides of the main frame by pivot pins 39 are rigidly connected together by a transverse rod 40 which extends beneath the vibrating gate and from one segmental plate to the other. The segmental plate 38 has rigidly connected thereto and moving therewith an angled arm 41 the upper end 42 of which when moved downwardly is adapted to engage the projecting arm 34 of the toggle link and cause it to move the clutch member to its inoperative position, and the lower end 43 of said arm when moved upwardly is adapted to engage the lower portion of the projecting arm and cause the clutch member to move into engagement with its complementary clutch member and operate the gate.

A depending tubular member 44 connected to the segmental plate 37 by a pivot pin 45 carries a plunger rod 46 which slides freely in the tubular member. A coiled spring 47 surrounding the plunger rod and interposed between the head of said rod and the tubular member serves to yieldingly hold said rod in its lowermost position. A link 48 pivotally connected at one end to the head of the plunger rod and adjustably connected to the main frame at its other end is adapted to swing the plunger rod head out of operative position when it is desired to stop the operation of the machine.

A bumper 49 provided on the inner end of the scale beam is positioned to strike the head of the plunger rod and swing the segmental arms upwardly and move the clutch member into operative position when the scale hopper is empty, to start the filling of said hopper with material.

In order to accurately weigh the material it is necessary to continue to feed the material to the weighing hopper during the short period of time the hopper is slowly descending to the discharging position and when down at the discharging position to stop the feed and simultaneously open the discharge gate. To accomplish this result the segmental plate 37 is pivotally connected to the main frame by toggle joint links 50 which are in horizontal alinement with each other when the scale hopper is in approximately its lowermost position. A drop bar 51 pivotally connected to the pivotal joint 52 of the links depends downwardly and is provided with an anti-friction roller 53 which is adapted to engage and momentarily rest upon the projecting pin 54 of the upper arm of a bell crank trigger 55 to prevent the mechanism from moving the clutch member into disengaging position while the scale hopper is moving downwardly to discharging position. The bell crank trigger is pivotally mounted on the main frame and its lower arm 56 extends horizontally beneath the compensating-lever hook arm 57 carried by and extending horizontally from the side of the scale hopper and at right angles with relation to the lower bell crank lever arm. The bell crank trigger is provided with a counterweight arm 58 to slightly overbalance the weight of the arms of the lever and to swing the projecting pin immediately beneath the roller of the drop arm when the scale receptacle is swung upwardly to the charging position. A stop 59 projecting from the frame limits the swing of the bell crank lever.

The hooked end of the hook arm 57 engages the free end of a compensating lever 60 which is pivotally connected to the frame and is provided with a compensating weight 61 adjustably and slidably mounted thereon. The drop bar 51 is provided with a depending offset portion 62 the lower end of which is pivotally connected to one end of a knock off lever 63 carried by the main frame. The outer free end of this lever extends beneath the free end of the weighted trip bell crank lever 64 fulcrumed on one end of the scale receptacle by the fulcrum pin 65. The upper end of the vertical arm 66 of the lever 64 is connected to a depending link 67 the lower end of which is connected to the hopper door 68. The link is provided with a curved portion 69 to permit the link and the upper arm of the bell crank lever to swing to a vertical position, in which position the pivotal connections are in alinement without striking the fulcrum of the lever. The hopper door is provided with arms carrying a weight 70 to normally hold the door in closed position.

In the operation of the weighing machine thus far described the hopper chute is filled with material which will rest upon the vibratory gate or bottom portion and when the gate is vibrated back and forth the material will be discharged from the lower end of the gate into the scale hopper, the scale hopper being in its uppermost position. When the scale hopper is in its uppermost position the toggle joint links will be inclined upwardly and the roller of the drop bar will rest directly on the projecting pin of the bell crank trigger. The plunger rod of the depending tubular member will be forced upwardly by the bumper connected to the scale beam and its spring placed under tension. When the material in the scale hopper approximately balances the weight of the scale the said hopper will begin to descend, being aided by the tension of the spring, until it reaches a position of exact balance when the compensating lever hook arm carried by the scale hopper will engage the horizontal arm of the bell crank trigger and swing it out of engagement with the roller of the drop bar. The drop bar will immediately drop with the toggle joint links and swing the upper end of the angled arm into engagement with the weighted clutch toggle and swing its weighted link over the vertical plane of its pivotal connections and it will then fall by gravity to its opposite position and slide the clutch member out of engagement with its complementary member and stop the feed. Simultaneously with the above movement the drop bar in dropping will swing the outer free end of the knock off lever upwardly and engage the weighted trip bell crank lever. This latter lever will be swung to a position so that the weight of the material resting on the hopper door will be sufficient to open the door and the material will be discharged from the scale hopper. When the material is discharged the door weight will close the door and swing the hopper bell crank lever into operative position and at the same time the scale hopper will start to ascend and the bumper will strike the plunger rod and compress the spring and force the parts into feeding position as before described and the operation will continue as long as material is fed to the hopper chute.

In the modified form shown in Fig. 7 an electric motor 71 is provided for rotating the cranked shaft and a switch 72 is provided for making and breaking the circuit to said motor. This switch is provided with a pivoted arm 73 which is held normally in contact with its complementary arm 73' by a spring 74' and is adapted to be swung out of contact therewith by means of the finger 74 carried by the scale beam when the scale hopper has been swung to a discharging position. In this modified form of scale the hopper door is operated by means of a stop 75 projecting from the main frame which is engaged by the hopper bell crank arm while the scale hopper is descending.

It is to be understood that any form of motor or switch may be used and that the motor may be belted to the crank shaft and also that the switch may be connected to any moving part of the scale without departing from the spirit and scope of the invention.

From the foregoing description it will be seen that the invention is simple in construction and operation and is strong and durable and is well adapted for feeding and weighing non-free-running-material, such as coal, cotton seed and other like material.

What I claim as my invention is:

1. An automatic weighing machine, comprising a scale beam having a weight at one end and a scale hopper at the other end provided with a discharging door, a chute hopper located above the plane of the scale hopper, a gate pivotally linked to and suspended beneath the chute hopper and having a slidable connection at its lower end with a part of the scale, and means for vibrating the gate, said means controlled by the weight of material fed into the scale hopper and the descent of the hopper and the movement of the hopper door.

2. An automatic weighing machine, comprising a scale beam having a weight at one end and a scale hopper at the other end provided with a discharging door, a chute hopper located above the plane of the scale hopper, a gate suspended beneath the chute hopper and having a pivotal connection at one end and a sliding connection at its other end, means for vibrating the gate to charge the scale hopper, and a connection between the scale hopper and the vibrating means for stopping the vibration of the gate while the scale hopper is descending to a discharging position.

3. An automatic weighing machine, comprising a frame a scale beam pivotally mounted thereon and having a weight at one end and a scale hopper at the other end provided with a discharging door, a chute hopper located above the plane of the scale hopper, a gate positioned beneath the chute hopper and suspended from links at one end and having a sliding engagement with the frame at its other end, means for vibrating the gate to charge the scale hopper, and a connection between the vibrating means and the scale hopper for stopping the vibration of the gate while the scale hopper is descending to a discharging position.

4. An automatic weighing machine, comprising a frame a scale beam pivotally mounted thereon and having a weight at one end and a scale hopper at the other end provided with a discharging door, a chute hopper located above the plane of the scale hopper, an inclined gate positioned beneath the chute hopper and suspended from links at one end and having a sliding engagement with the frame at its other end, a crank shaft journaled on the frame, a connection between the crank of the shaft and the gate, means for rotating the shaft, and a connection between the rotating means and the scale hopper for stopping the rotation of the crank shaft while the scale hopper is descending to a discharging position.

5. An automatic weighing machine, comprising a main frame, a scale beam pivotally mounted thereon and having a weight at one end and a scale hopper at the other end provided with a discharging door, a chute hopper mounted on the frame and having an open bottom portion and an end discharge opening, a gate covering the bottom opening of the chute hopper and extending beyond each end thereof and having a pivotal and slidable connection with the frame, one end of the gate positioned above the scale hopper, a shaft journaled on the frame and provided with a cranked portion having a linked connection with the gate, means for rotating said shaft, a clutch mechanism for connecting said shaft rotating means to the shaft, a lever for operating the clutch mechanism, an arm pivotally connected to the frame for operating the clutch mechanism, and means connected to the scale hopper for moving the arm to cause the rotation of the shaft when the scale hopper is in charging position and to move the arm to stop the rotation of the shaft when the scale hopper is in discharging position.

6. An automatic weighing machine, comprising a main frame, a scale beam pivotally mounted thereon and having a weight at one end and a scale hopper at the other end provided with a discharging door, a chute mounted on the frame and having an open bottom portion and an end discharge opening, an inclined gate pivotally connected at one end to the frame and having a slidable connection on the frame at its other end, said gate covering the bottom opening of the chute hopper and extending beyond each end thereof and with the lower end of the gate positioned to discharge material into the scale hopper, a shaft journaled on the frame and provided with a cranked portion having a linked connection with the gate, means for rotating said shaft, a clutch mechanism for connecting the shaft rotating means to the shaft, weighted toggle joint levers for operating the clutch mechanism, an arm pivotally connected to the frame for moving the toggle joint levers, a member depending from the arm, and a bumper on the scale beam for engaging the depending member.

7. An automatic weighing machine, comprising a main frame, a scale pivotally mounted thereon, a weight receptacle at one end of the beam, a scale hopper suspended from the opposite end of the beam and provided with a discharging door in its lower portion, a chute hopper mounted on the frame and having an open bottom portion and an end discharging door, a gate positioned beneath the hopper chute and provided with side flanges which extend on each side of the chute hopper, said gate suspended from links at one end and having its other end slidably resting on the frame, a shaft journaled on the frame and provided with a cranked portion, a link connected to the cranked portion of the shaft and to the gate, means for rotating said shaft, a clutch mechanism for connecting the shaft rotating means to the shaft, weighted toggle joint levers for operating the clutch mechanism, a segmental plate pivotally connected to the frame, an arm carried by said plate, said arm positioned to engage the toggle joint levers to move one of the clutch members, a yielding member depending from the segmental plate, a bumper carried by the scale beam and positioned to engage the depending arm when the scale hopper is in its upper position, toggle joint links pivotally connected at their outer ends to the segmental plate and to the frame and connected together at their inner ends, a drop bar connected to the toggle links and depending therefrom, a weighted bell crank trigger pivoted on the frame and having one arm positioned to engage the drop bar and hold the toggle links in their upper position while the scale hopper is slowly descending toward its discharging position, an arm carried by the scale hopper and positioned to engage one of the arms of the trigger and swing it out of engagement with the drop bar when the scale hopper has approximately reached its discharging position, a knock off lever fulcrumed on the scale hopper and having one end connected to the lower portion of the drop bar, a weighted trip bell-crank lever fulcrumed on the scale hopper and having one of its arms positioned to engage the free end of the knock off lever, and a link connected to the other arm of the bell crank lever and to the door of the scale hopper.

In testimony whereof I affix my signature in presence of two witnesses.

HENRY W. WELSH.

Witnesses:
C. H. KEENEY,
LAURA A. KILLEY.